United States Patent [19]
Bezerie

[11] 3,862,421
[45] Jan. 21, 1975

[54] METHOD FOR PRODUCING AT A DISTANCE A REPRESENTATION OF THE PATH OF A POINT OF A STRUCTURE AND DEVICE FOR CARRYING OUT SAID METHOD

[75] Inventor: Jean Pierre Bezerie, Ville D'Avray, France

[73] Assignee: Societe Anonyme De Telecommunications, Paris, France

[22] Filed: June 8, 1973

[21] Appl. No.: 368,189

[30] Foreign Application Priority Data
June 23, 1972 France .............................. 72.22793

[52] U.S. Cl.................. 250/330, 250/202, 250/334
[51] Int. Cl. .............................................. G01j 1/04
[58] Field of Search ............ 250/202, 330, 332, 334

[56] References Cited
UNITED STATES PATENTS
3,209,149  9/1965  Tucker............................ 250/334 X
3,418,478  12/1968  Falbel................................. 250/202
3,639,767  2/1972  Sitnichenko et al. ............... 250/202
3,705,955  12/1972  Assouline et al. .............. 250/334 X
3,711,717  1/1973  Rich et al. ........................... 250/202

Primary Examiner—Archie R. Borchelt

[57] ABSTRACT

A method for producing at a distance a representation of the path of a point of a structure, comprising materializing the point to be observed by a source of infrared radiation, observing the structure by means of a device for analysing the infra-red image of the source which device is oriented in such manner that its optical axis is substantially perpendicular to the known osculating plane of the path of the point and intersects said plane in the region of displacement of the point, sending the electric current detected by said analysing device to an electronic device which produces from said detecting current two direct voltages which represent the Cartesian co-ordinates of the instantaneous image of the source of a reference system pertaining to the analysing device, and furnishing said two voltages to a receiving device.

3 Claims, 1 Drawing Figure

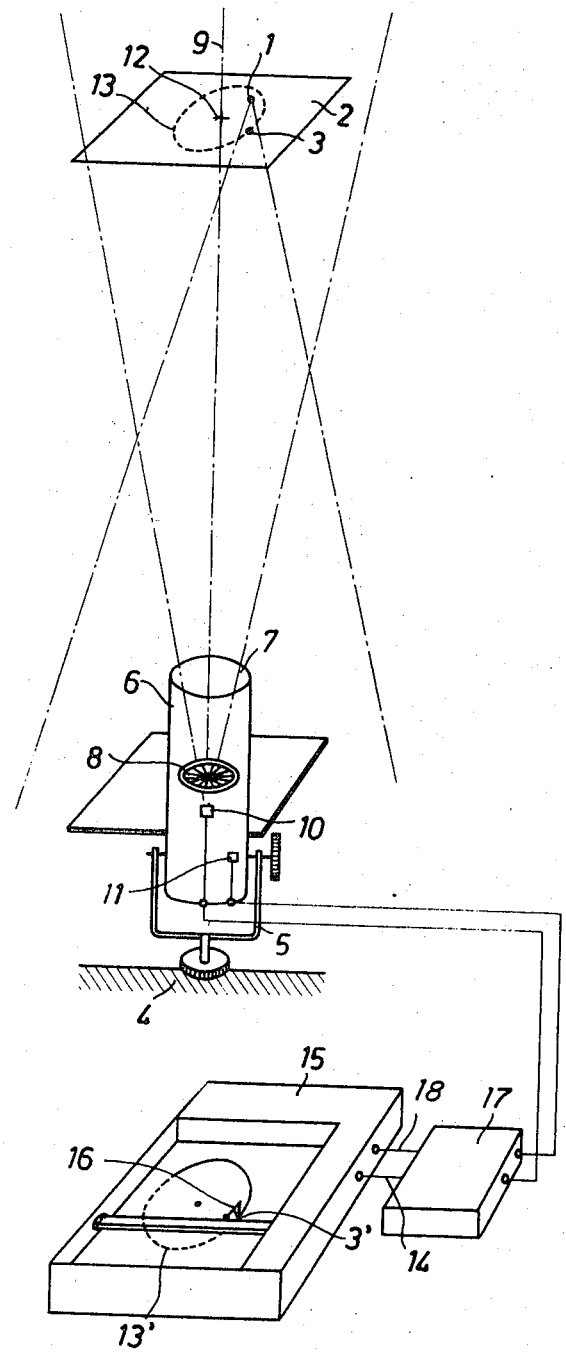

METHOD FOR PRODUCING AT A DISTANCE A REPRESENTATION OF THE PATH OF A POINT OF A STRUCTURE AND DEVICE FOR CARRYING OUT SAID METHOD

The invention relates to a method for following at a distance and materializing the displacement of a point remote from the place in which the observing means are positioned, the point pertaining to a structure the deformations of which are desired to be known.

Owing to the fact that it is governed by the structure, the point described a path which is not free but related to the possible deformations of the structure. If this point is sufficiently remote from the observing apparatus, the surface or the volume on which this path is inscribed will be very near to the osculating plane of the path and the curve projected on this osculating plane can be likened to the actual path of the point or will at least furnish a very sufficient approximation of its displacement.

An observation made along an axis of sight perpendicular, or at least substantially perpendicular, to this osculating plane will therefore enable this projected path to be followed. Bearing in mind the great distance between the materialized point and the observer and the amplitudes of the displacement of the materialized point, a visual observation will in no way permit ascertaining the displacement of the point. Further, no recording could be made.

If it is contemplated to fix on a sensitive film by means of a photographic apparatus the displacement of the point during a rather long period an extremely large enlargement would be necessary to obtain a curve which is visible, but the variations in the lighting conditions would rapidly render the film useless. Sequential photographs would not permit obtaining the actual path of the point but only successive views of the point in various positions and it would be necessary to subsequently reconstitute the path with the inaccuracies associated with the photographic systems, enlargement, etc.

An object of the invention is to provide a new method whereby it is possible to obtain with known means, permanently and without intervention on the part of the observer, voltages which represent the instantaneous co-ordinates of the point in a reference system solely related to the observing apparatus.

The invention provides a method for producing at a distance a representation of the path of a point of a structure, comprising materializing the point to be observed by a source of infra-red radiation, observing the structure with a device for analysing the infra-red image of the source which device is oriented in such manner that its optical axis is substantially perpendicular to the known osculating plane of the path of the point and meets this plane in the region of displacement of the point, sending the electric current detected by said analysing device to an electronic device which produces from said detected current two direct voltages which represent the Cartesian co-ordinates of the instantaneous image of the source in a reference system pertaining to the analysing device, and furnishing said two voltages to a receiving device.

Advantageously, the receiving device comprises at least one tracing table furnishing an image in a system of rectangular co-ordinates connected thereto.

The method according to the invention therefore permits automatically and continuously obtaining in the day time and at night a trace at a distance, with respect to real time, of a homothetic curve of the projection of the path of the observed point on a plane perpendicular to the axis of sight. No material connection exists between the point or the observed structure and the observing device. The latter is installed at a fixed station, the most favourable working conditions being chosen which are limited only by the requirement that the axis of sight be as near as possible to a perpendicular to the osculating plane of the path of the observed point. In practice, with sufficient distances, it is possible to deviate from this condition without the obtained image being excessively deformed and this image will always be useful for analysing the real displacements of the observed point and therefore the deformations of the structure.

Another object of the invention is to provide a device for carrying out said method, said device comprising a source of infra-red radiation connected to the structure to be observed, a device for analysing the infra-red image of said source, support means for said device whereby it is possible to orient the device in elevation and bearing, an electronic device producing from the current detected by the analysing device two direct voltages which represent the Cartesian co-ordinates of the instantaneous image of the source in a reference system pertaining to the device, and receiving means receiving said voltages.

The invention will be better understood from the ensuing description with reference to the accompanying drawing in which the single FIGURE is a diagrammatic perspective view of one embodiment of a device according to the invention.

The point to be observed is materialized on the structure by a source of infra-red radiation 1. The displacement of the point 1 occurs in spatial path which depends on the possible deformations of the structure and is determined by haphazard conditions, for example, meteorological conditions. This path has an osculating plane 2 on which the point 1 is projected rectangularly at a point 3.

The observing system employed rests on a fixed support 4 on the ground through an adjustable support 5. It comprises in the known manner an infra-red analysing head 6 whose angle of elevation and bearing may be adjusted by means of the adjustable support 5. Briefly, it will be mentioned that a known infra-red analysing head 6 comprises an infra-red objective 7, a mechanical modulator 8 which undergoes in a plane perpendicular to the optical axis 9 a movement of circular translation, a detecting cell 10 responsive to infra-red and placed at the focus of the objective 7, a second cell 11 which is part of an opto-electronic treating unit (not shown), the cells 10 and 11 being connected to an electronic device 12.

The place of the support 4 and the position of the adjustable support 5 are such that the optical axis 9 of the objective 7 is perpendicular to the plane 2 and intersects the latter at a point 12 located within the path 13 of the projected point 3, or at least in the vicinity of said path. Also, it is ensured that two rectangular axes in the plane of the modulator 8 are suitably oriented. The plane of the modulator 8 and the plane 2 are therefore parallel and in the illustrated embodiment these planes are horizontal, the axis 9 being vertical. Any other configuration may be adopted in accordance with the possible path of the point to be observed and the convenience of the place of the observing equipment.

The infra-red observing head 6 which operates, bearing in mind the distances, as if the source 1 were at point 3, forms in its focal plane an image of this point which is eccentric with respect to the focus when the source 1 is not on the optical axis 9. The current detected by the cell 10 is then composed of pulses modulated in frequency by the mechanical modulator 8, the instantaneous frequency of this current varying sinusoidally and at very low frequency about a constant central frequency.

After discrimination and filtering, a sinusoidal current is obtained whose amplitude and phase are the values of the polar co-ordinates of the image of the point 3 focussed in the plane of the modulator 8 which coincides with the plane of the sensitive surface of the cell 10. The current from the cell 11 determines an origin of the phases and permits, owing to the device 17, converting the polar co-ordinates into Cartesian co-ordinates which are available in the form of two direct voltages, which vary with the position of the point 3, respectively at the inputs 18 and 14 of the device 17.

In the presently described embodiment, these direct voltages are fed to the X-Y inputs of a tracing table 15 and cause the displacement of a tracing stylus 16 which inscribes a point 32' which is the instantaneous image of the point 3. The scale of the path 13' of the point 3' may be chosen by adjusting amplifying elements in the device 17 and the table 15 so that this path remains inscribed within the available dimensions of the table. It is easy to know, by a prior setting, the constant homothetic ratio between the path 13' of the point 3' and the path 13 of the point 3.

It willl be understood that, in accordance with particular applications, the X and Y voltages available at the outputs 18 and 14 could serve to supply any suitable device, such as a display tube, a computer, etc. Each of these voltages could be supplied to a tracing table so as to follow the variations with respect to time of the corresponding co-ordinate of the image of the observed point.

In order to facilitate the setting of the observing device, it may be provided with an optical sighting telescope (not shown) whose optical axis is parallel to the optical axis 9 of the infra-red objective 7. Subsequent to the choice of the place of the observing equipment, governed by the direction of the osculating plane 2 and, of course, the possibilities of observation, the operator will bring by direct sighting the axis of the telescope onto the materialized point whose displacements are sufficiently small to enable him to see it as a fixed point. He will lock the apparatus in this position and, as soon as it is supplied with power, the device will operate without any operator being necessary.

What I claim is:

1. A method for producing at a distance a representation of the path of a point of a structure, comprising the steps of materialising the point to be observed by a source of infra-red radiation, observing the structure by means of a device for analysing the infra-red image of the source, which device comprises an infra-red analysing head including an infra-red objective, a mechanical modulator undergoing in a plane perpendicular to the optical axis a movement of circular translation and a detecting cell placed at the focus of said objective, said device being oriented in such manner that the optical axis of said objective is substantially perpendicular to the known osculating plane of the path of the point and intersects said plane in the region of displacement of the point, sending the electric current detected by said analysing device to an electronic device which produces from said detected current two direct voltages which represent the Cartesian co-ordinates of the instantaneous image of the source in a reference system pertaining to the analysing device, and furnishing said two voltages to a receiving device.

2. A method as claimed in claim 1, wherein at least one tracing table of the receiving device furnishes an image in a system of rectangular co-ordinates with which the receiving device is associated.

3. A static device for automatically and continuously obtaining in the daytime and at night a trace at a distance with respect to real time of a homothetic curve of the projection of the path of an observed point on a plane perpendicular to the axis of sight, there being no material connection between the point or the observed structure and the observing device which is installed at a fixed station located with the axis of sight as nearly as possible perpendicular to the osculating plane of the path of the observed point, said device comprising a source of infra-red radiation connected to the structure to be observed, a device for analysing the infra-red image of said source, support means for said device to orient the device in elevation and bearing, an electronic device producing from the current detected by the analysing device two direct voltages representing the Cartesian co-ordinates of the instantaneous image of the source in a reference system and receiving means receiving said voltages.

* * * * *